United States Patent
Magera

(10) Patent No.: US 11,988,630 B2
(45) Date of Patent: May 21, 2024

(54) METHOD TO USE ARTIFICIAL INTELLIGENCE TO ENHANCE VISUAL INSPECTION OF OXYGEN SENSORS

(71) Applicant: Robert Bosch GmbH, Stuttgart (DE)

(72) Inventor: Craig Magera, Simpsonville, SC (US)

(73) Assignee: Robert Bosch GmbH, Stuttgart (DE)

(*) Notice: Subject to any disclaimer, the term of this patent is extended or adjusted under 35 U.S.C. 154(b) by 396 days.

(21) Appl. No.: 17/509,982

(22) Filed: Oct. 25, 2021

(65) Prior Publication Data

US 2023/0130751 A1    Apr. 27, 2023

(51) Int. Cl.
*G01N 27/417* (2006.01)
*G01N 23/046* (2018.01)
(Continued)

(52) U.S. Cl.
CPC ....... *G01N 27/4175* (2013.01); *G01N 23/046* (2013.01); *G01N 23/18* (2013.01);
(Continued)

(58) Field of Classification Search
CPC ........... A61B 6/03; A61B 6/032; A61B 6/035; A61B 6/037; G01N 2223/04; G01N 2223/1016; G01N 2223/309; G01N 2223/401; G01N 2223/419; G01N 2223/426; G01N 2223/645; G01N 2223/646; G01N 23/04; G01N 23/046; G01N 23/083; G01N 23/085;
(Continued)

(56) References Cited

U.S. PATENT DOCUMENTS 7,013,701 B2    3/2006  Kawashima
7,254,211 B2    8/2007  Hunt et al.
(Continued)

FOREIGN PATENT DOCUMENTS

EP    2044975 A1 *   4/2009   ........... A61N 5/1049

OTHER PUBLICATIONS

Henzler et al, Single-image Tomography: 3D Volumes from 2D Cranial X-Rays, arXiv:1710.04867v3 [cs.GR] Nov. 28, 2018 (Year: 2018).*

*Primary Examiner* — David L Singer
(74) *Attorney, Agent, or Firm* — Michael Best & Friedrich LLP

(57) ABSTRACT

A system configured to detect defects in a first oxygen sensor is disclosed. The system includes an X-ray imaging device configured to capture a production X-ray image of the first oxygen sensor and an electronic processor configured to use a trained oxygen sensor defect detection model to identify a defect of the first oxygen sensor by producing a pseudo X-ray image by simulating a projection of a fan beam through CT data of a second oxygen sensor. The electronic processor is also configured to measure, via the trained oxygen sensor defect detection model, a fan-beam distortion in the production X-ray image; select, via the trained oxygen sensor defect detection model, the pseudo X-ray image based on the fan-beam distortion; perform a comparison, via the trained oxygen sensor defect detection model, of the production X-ray image to the pseudo X-ray image; and, classify, based on the comparison, the production X-ray image as representing an improperly assembled oxygen sensor.

18 Claims, 5 Drawing Sheets

(51) Int. Cl.
*G01N 23/18* (2018.01)
*G01N 27/416* (2006.01)
*G06N 20/00* (2019.01)
*G06T 11/00* (2006.01)

(52) U.S. Cl.
CPC ......... *G01N 27/4163* (2013.01); *G06N 20/00* (2019.01); *G06T 11/003* (2013.01); *G01N 2223/04* (2013.01); *G01N 2223/401* (2013.01); *G01N 2223/419* (2013.01); *G01N 2223/426* (2013.01); *G01N 2223/645* (2013.01); *G01N 2223/646* (2013.01); *G06T 2207/10081* (2013.01); *G06T 2207/10116* (2013.01); *G06T 2207/20081* (2013.01)

(58) Field of Classification Search
CPC .. G01N 23/087; G01N 23/18; G01N 27/4163; G01N 27/4175; G06N 20/00; G06T 11/003; G06T 11/005; G06T 11/008; G06T 2207/10072; G06T 2207/10076; G06T 2207/10081; G06T 2207/10084; G06T 2207/10088; G06T 2207/10092; G06T 2207/10096; G06T 2207/10101; G06T 2207/10104; G06T 2207/10108; G06T 2207/10112; G06T 2207/10116; G06T 2207/10121; G06T 2207/10124; G06T 2207/10128; G06T 2207/20081; G06T 2211/40; G06T 2211/404; G06T 2211/408; G06T 2211/412; G06T 2211/416; G06T 2211/421; G06T 2211/424; G06T 2211/428; G06T 2211/432; G06T 2211/436; G06T 2211/441; G06T 2211/444; G06T 2211/448; G06T 2211/452; G06T 2211/456; G06T 2211/461; G06T 2211/464

See application file for complete search history.

(56) References Cited

U.S. PATENT DOCUMENTS

| | | |
|---|---|---|
| 8,131,107 B2 | 3/2012 | Sun et al. |
| 10,557,817 B2 | 2/2020 | Okamoto et al. |
| 2018/0195978 A1* | 7/2018 | Schneider ............... G06T 7/001 |
| 2020/0166477 A1 | 5/2020 | Lobbert et al. |
| 2020/0378904 A1* | 12/2020 | Albarqouni .......... G01N 23/083 |
| 2021/0116434 A1 | 4/2021 | De Beenhouwer et al. |

* cited by examiner

METHOD TO USE ARTIFICIAL INTELLIGENCE TO ENHANCE VISUAL INSPECTION OF OXYGEN SENSORS

BACKGROUND

Embodiments relate to improved testing of oxygen sensors.

Oxygen sensors often include components that are susceptible to damage or misalignment in the manufacturing or assembly process. A technician can visually inspect the components of an assembled oxygen sensor for damage or misalignment by taking an X-ray image of the oxygen sensor. In order to obtain such an X-ray image, the technician manually places the oxygen sensor in a fixture and places the fixture in the image capture region of an X-ray machine.

SUMMARY

Manual placement of an oxygen sensor in a fixture can create imaging inconsistencies. For example, manual placement can cause X-ray image misalignment. Misalignment may also be compounded by a natural fan-beam distortion in the X-ray image. These issues, particularly in combination, can make visual inspection of X-rays difficult or result in inaccurate assessments.

One embodiment provides a system configured to detect defects in a first oxygen sensor. The system includes an X-ray imaging device configured to capture a production X-ray image of the first oxygen sensor The system also includes an electronic processor configured to use a trained oxygen sensor defect detection model to identify a defect of the first oxygen sensor. The electronic processor identifies a defect by producing a pseudo X-ray image by simulating a projection of a fan beam through CT data of a second oxygen sensor; measuring, via the trained oxygen sensor defect detection model, a fan-beam distortion in the production X-ray image; selecting, via the trained oxygen sensor defect detection model, the pseudo X-ray image based on the fan-beam distortion; performing a comparison, via the trained oxygen sensor defect detection model, of the production X-ray image to the pseudo X-ray image; and, classifying based on the comparison, the production X-ray image as representing an improperly assembled oxygen sensor.

Another embodiment provides a non-transitory, computer-readable medium containing instructions that, when executed by an electronic processor, cause the electronic processor to: obtain a production X-ray image of a first oxygen sensor; produce a pseudo X-ray image by simulating a projection of a fan beam through CT data of a second oxygen sensor; measure, via a trained oxygen sensor defect detection model, a fan-beam distortion in the production X-ray image; select, via the trained oxygen sensor defect detection model, the pseudo X-ray image based on the fan-beam distortion; perform a comparison, via the trained oxygen sensor defect detection model, of the production X-ray image to the pseudo X-ray image; classify based on the comparison the production X-ray image as representing an improperly assembled oxygen sensor.

Another embodiment provides a method of using a machine learning algorithm to produce a trained oxygen sensor defect detection model. The method includes providing, to a machine learning algorithm, CT data collected by scanning a plurality of oxygen sensors; producing a plurality of pseudo X-ray images by simulating a projection of a fan beam through CT data; identifying a grouping of pseudo X-ray images of properly manufactured oxygen sensors and a grouping of pseudo X-ray images representing improperly manufactured oxygen sensors within the CT data; providing, to the machine learning algorithm, a plurality of X-ray images of oxygen sensors; identifying a grouping of X-ray images of properly manufactured oxygen sensors and a grouping of X-ray images representing improperly manufactured oxygen sensors within the plurality of X-ray images; training, via machine learning algorithm, the oxygen sensor defect detection model by causing the machine learning algorithm to perform a first correlation of the X-ray images of improperly manufactured oxygen sensors to the pseudo X-ray images representing improperly manufactured oxygen sensors, causing the machine learning algorithm to perform a second correlation of the X-ray images of properly manufactured oxygen sensors to the pseudo X-ray images representing properly manufactured oxygen sensors, providing, to the machine learning algorithm, corrections to mistakes made by machine learning algorithm in performing the first correlation, providing, to the machine learning algorithm, corrections to mistakes made by machine learning algorithm in performing the second correlation, and updating the oxygen sensor defect detection model based on the first and second correlation, and the corrections.

Other embodiments and aspects will become apparent by consideration of the detailed description and accompanying drawings.

DETAILED DESCRIPTION

Figure 1:
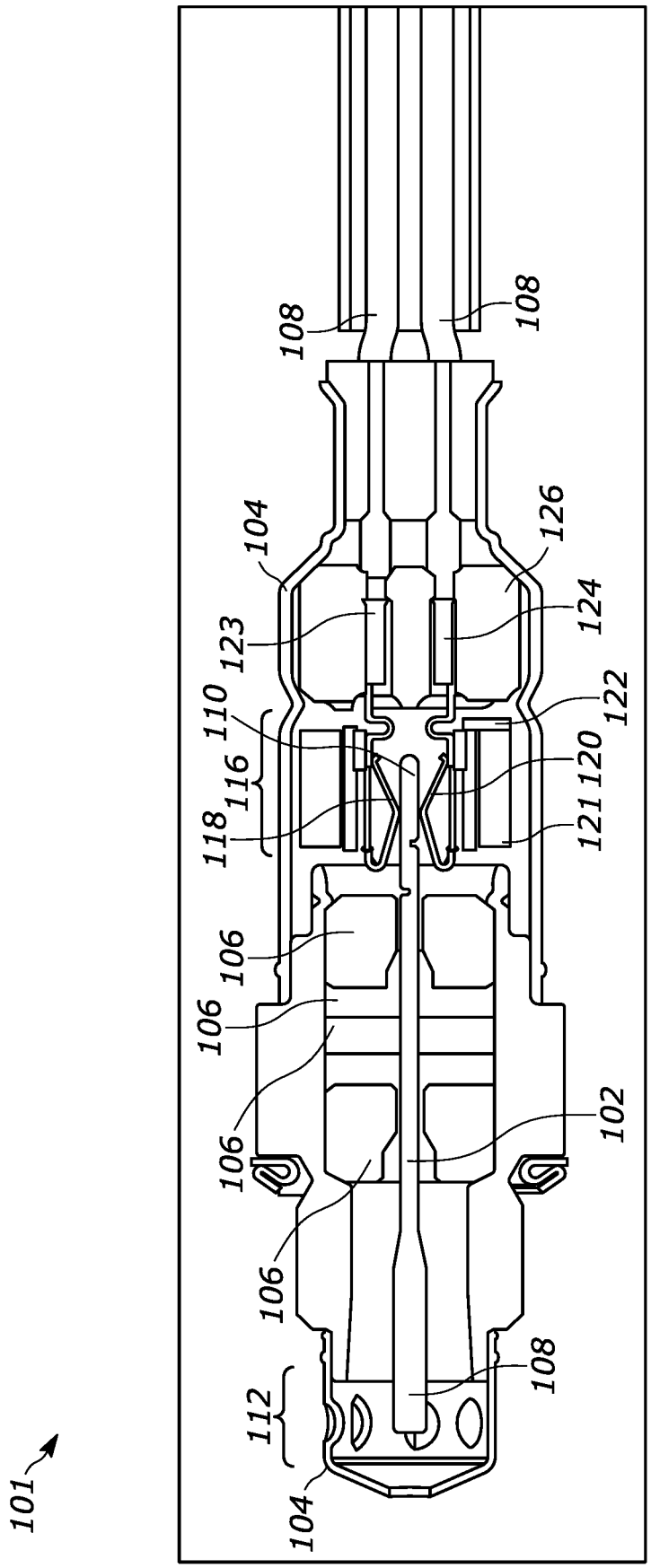
FIG. 1 illustrates a sectional view of an assembled oxygen sensor.

Before any embodiments are explained in detail, it is to be understood that the embodiments described and illustrated are not limited in their application to the details of construction and the arrangement of components set forth in the following description or illustrated in the following drawings. Other embodiments are possible and embodiments described and illustrated are capable of being practiced or of being carried out in various ways.

Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. As used within this document, the word "or" may mean inclusive or. As a non-limiting example, if it we stated in this document that "item Z may comprise element A or B," this may be interpreted to disclose an item Z comprising only element A, an item Z comprising only element B, as well as an item Z comprising elements A and B.

A plurality of hardware and software-based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components. Unless otherwise indicated, functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

FIG. 1 illustrates a sectional view of an oxygen sensor 101. In the example illustrated, the oxygen sensor 101 includes a sensor element 102. The sensor element 102 is retained in a housing and protective sleeve assembly 104 by a retaining bushing 106. The retaining bushing 106 holds the sensor element 102. The sensor element 102 includes a sensing end 108 and a power and data lead end 110. The sensing end 108 extends into a sensing chamber 112 of the housing and protective sleeve assembly 104. As gasses flow through the sensing chamber 112, the sensing end 108 is exposed to the gasses and senses an amount of oxygen present in a gas (e.g., an exhaust stream of an internal combustion engine). The power and data lead end 110 extends into an electrical contacts chamber 116 of the housing and protective sleeve assembly 104. The power and data lead end 110 is connected to data contacts 118 and power contacts 120, and is configured to produce an output signal indicative of the amount (e.g., a percentage concentration) of oxygen sensed in the exhaust stream. The output signal produced by the power and data lead end 110 is provided to the data contacts 118. In the embodiment shown, the data contacts 118 and power contacts 120 are spring contacts. The components of the electrical contacts chamber 116 are secured in the housing and protective sleeve assembly 104 by a securing bushing 121 clipped to the housing and protective sleeve assembly 104 by a spring clip 122. The power contacts 120 carry power to the sensor element 102. Connections between the data contacts 118 and data wires 123, and between the power contacts 120 and power wires 124 are stabilized within the housing and protective sleeve assembly 104 by an isolation bushing 126. The data wires 123 and power wires 124 extend out of the housing and protective sleeve assembly 104 and are configured to connect to a controller (not shown) and power source (not shown), respectively.

Figure 2:
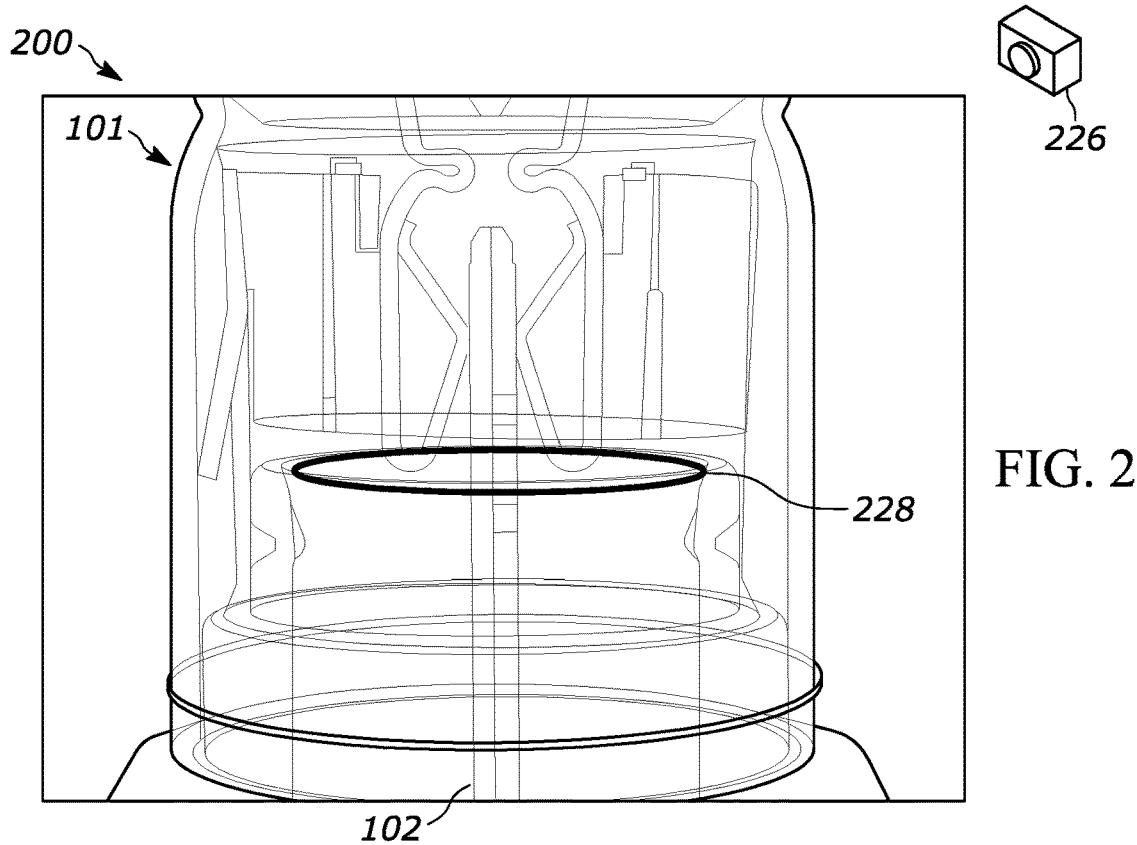
FIG. 2 illustrates an X-ray image of an oxygen sensor, where the oxygen sensor is properly aligned with respect to an imaging device.

FIG. 2 illustrates an X-ray image 200 of an oxygen sensor 101, where the oxygen sensor 101 is properly aligned with respect to the X-ray imaging device 226. In the X-ray image 200, different parts of the oxygen sensor 101 appear in different shades of black and white depending on the amount of X-ray absorbed by the various parts. Overall, the oxygen sensor 101 appears as if it were transparent and components within the oxygen sensor 101 may be seen. The X-ray image 200 contains a fan-beam distortion due the shape of the X-ray beam used by the X-ray imaging device 226. In the embodiment shown, the mouth of an aperture 228 is visible. As will be described in further detail below, the dimensions of this aperture 228 can be measured and trigonometrically correlated to a measured width of the sensor element 102 to determine a rotational misalignment of the sensor with respect to the X-ray imaging device 226.

Figure 3:
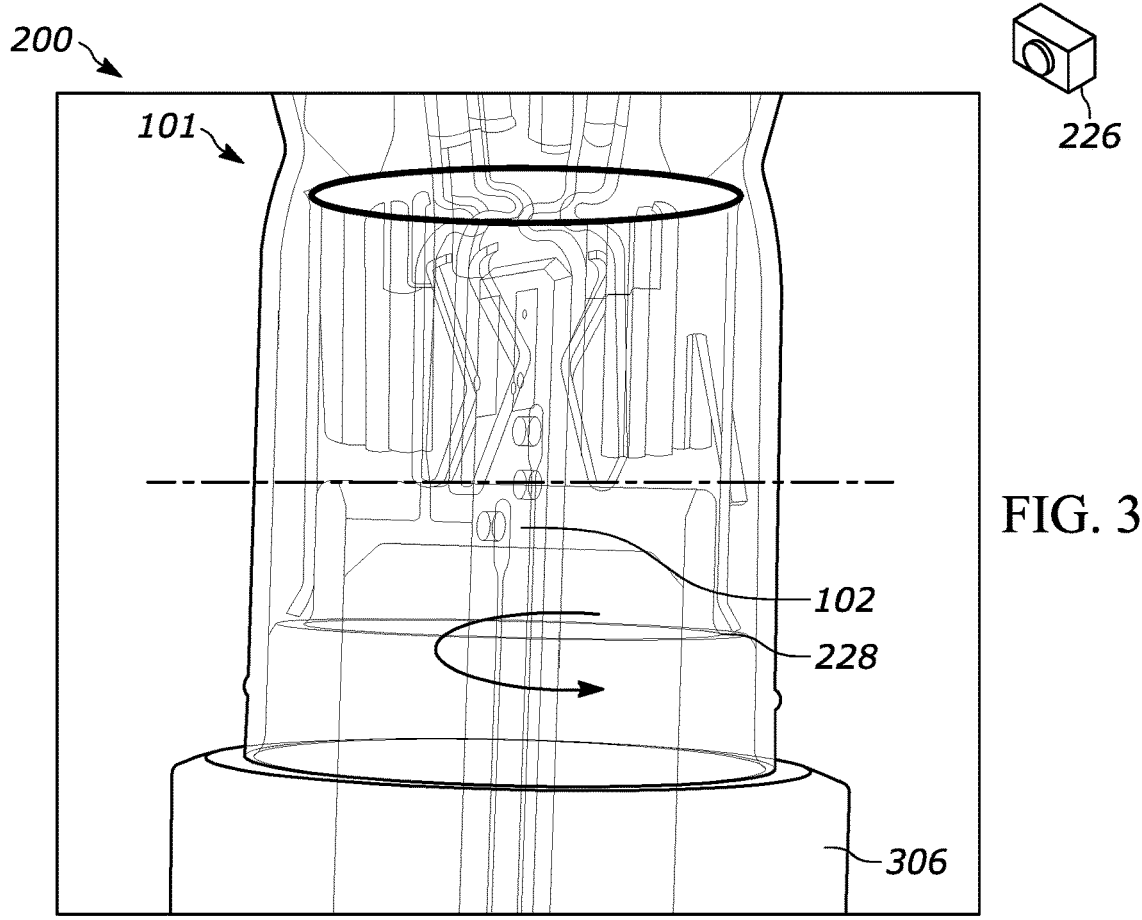
FIG. 3 illustrates an X-ray image of an oxygen sensor, where the oxygen sensor is rotated and misaligned.

FIG. 3 illustrates an X-ray image 200 of an oxygen sensor 101, where the oxygen sensor 101 is rotated and positionally misaligned with respect to the X-ray imaging device 226. In the embodiment shown, the oxygen sensor 101 and the X-ray imaging device 226 are rotated with respect to one another, as evidenced by the sensor element 102 appearing to be wider with respect to the aperture 228 than it would if there were no such respective rotation. The oxygen sensor 101 is also positionally misaligned with respect to the X-ray imaging device 226, as evidenced by the mouth of aperture 228 appearing to have a different circumference than it would if there were no such misalignment.

Figure 4:
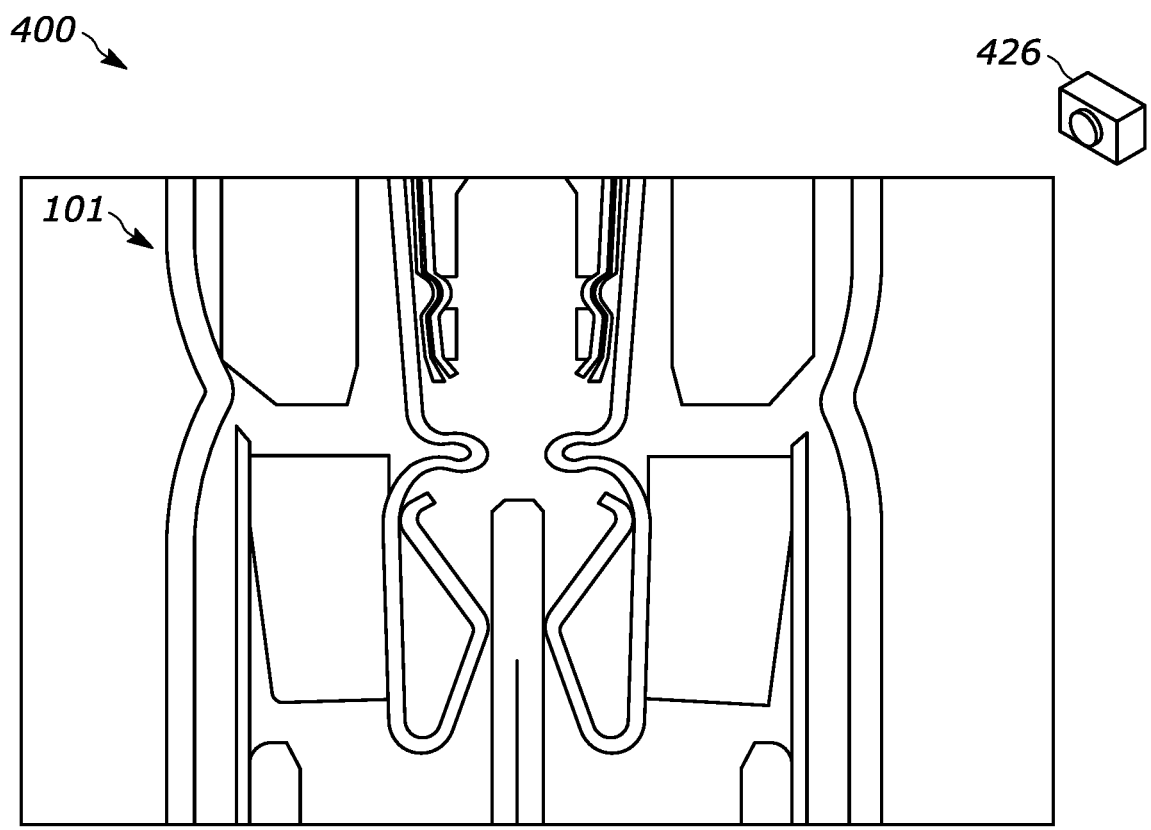
FIG. 4 illustrates a slice or cross-sectional image from a computed tomography (CT) scan of an oxygen sensor.

FIG. 4 illustrates a reconstruction 400 of CT scan data produced by a CT imaging device 426. The CT imaging device 426 produces CT data that is collectively considered a volume of data. Images can be rendered from the volume of data from various perspectives within the volume as a reconstruction 400. However, the reconstruction 400 does not include fan-beam distortion like the X-ray image 200 because CT scans do not use fan-beams to produce image data. Therefore, to properly correlate (e.g., compare) the X-ray image 200 to an image reconstructed or produced from CT data, the electronic processor (not shown) creates a pseudo X-ray image (not shown) using a calculation that simulates X-ray projection distortion. In the embodiment shown, a machine learning algorithm is trained to create the pseudo X-ray image from CT scan data, and to correlate the pseudo X-ray image to the X-ray image 200.

In some embodiments, an electronic processor produces pseudo X-ray images of the oxygen sensor 101 by performing a mathematical calculation on CT data of the oxygen sensor 101. The pseudo X-ray images are synthesized images approximating a production X-ray image 200 of the oxygen sensor 101. The electronic processor produces the pseudo X-ray images by simulating a projection of a fan beam through a volume of CT data. A plurality of pseudo X-ray images from various perspectives of the oxygen sensor 101 are created by transforming the CT data before performing the fan beam projection simulation. The electronic processor selects a perspective of the CT data, and vertically or horizontally transforms the CT data by various distances so that the data is misaligned (e.g., not centered) with the perspective selected by the electronic processor. In some embodiments, the electronic processor also rotates the CT data by various degrees with respect to the perspective selected by the electronic processor. After the CT data is transformed, the fan beam projection simulation is run by the electronic processor on the transformed CT data to produce a pseudo X-ray image. Each pseudo X-ray image contains a fan beam distortion based upon the vertical and horizontal transform (e.g., misalignment) and rotation of the CT data with respect to the simulated source of the simulated fan beam projection. Once generated, the pseudo X-ray images are stored in the central storage system for correlation to production X-ray images 200.

Figure 5:
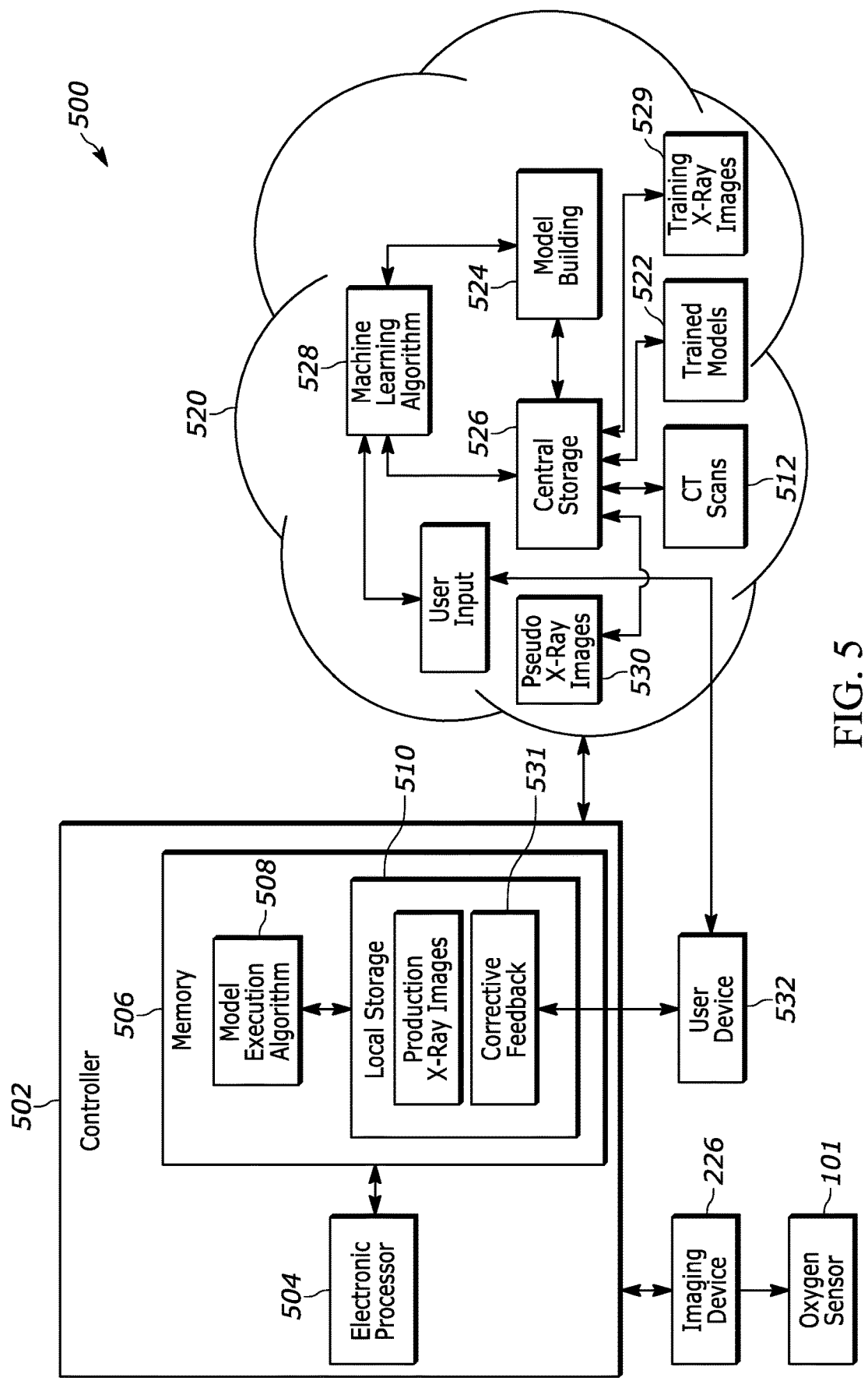
FIG. 5 illustrates schematic for an oxygen sensor imaging and inspection system according to some embodiments.

FIG. 5 illustrates an oxygen sensor imaging and inspection system 500. In the example shown, system 500 includes a controller 502 having an electronic processor 504 in electrical communication with a memory 506. The memory 506 includes a model execution algorithm 508 and a local storage 510. The local storage 510 is configured to store production X-ray images 200 of the oxygen sensor 101 received from the X-ray imaging device 226 and CT scan data 512 received from a central computing system 520. The electronic processor 504 is configured to execute the model execution algorithm 508 against data held in local storage 510. Trained oxygen sensor defect detection models 522 are produced by a model building block 524 of the central computing system 520. The model execution algorithm 508 is configured to use the trained oxygen sensor defect detection models 522 to determine whether the production X-ray images 200 from the X-ray imaging device 226 depict properly assembled oxygen sensors 101.

In the example shown, the central computing system 520 includes a central storage system 526, the model building block 524, and a machine learning algorithm 528. The model building block 524 is configured to store CT scan data 512, training X-ray images 529, pseudo X-ray images 530, and the trained oxygen sensor defect detection models 522. The central storage system 526 includes CT scan data 512 and trained oxygen sensor defect detection models 522. CT scan data 512 includes volumetric image data and metadata collected by the CT imaging device 426 as it produces volumetric images of a plurality of properly assembled oxygen sensors 101 and a plurality of improperly assembled oxygen sensors 101. The trained oxygen sensor defect detection models 522 include trained oxygen sensor defect detection models 522, trained by machine learning algorithm 528. As will be described in further detail below, the machine learning algorithm 528 is configured to be trained by correlating (e.g., comparing) the pseudo X-ray images 530 to training X-ray images 529, determine whether training X-ray images 529 show a properly or improperly assembled oxygen sensor 101, and receive and incorporate corrective feedback 531 from a user device 532 into the source code of the machine learning algorithm 528.

The machine learning algorithm 528 is configured to correlate pseudo X-ray images 530 created based on the CT scan data 512 to training X-ray images 529. Each of a plurality of the pseudo X-ray images 530 corresponds to one of a plurality of oxygen sensors 101. Groupings of pseudo X-ray images 530 can be separated and classified as properly or improperly assembled via input from the user device 532. Similarly, groupings of training X-ray images 529 can be separated and classified as representing (e.g. depicting) properly or improperly assembled oxygen sensors 101 via input from the user device 532. The machine learning algorithm 528 produces rules for identifying production X-ray images 200 of properly and improperly assembled oxygen sensors 101 based on a correlation of training X-ray images 529 of properly and improperly assembled oxygen sensors 101 to pseudo X-ray images 530 created based on CT scan data 512 of properly and improperly assembled oxygen sensors 101. The machine learning algorithm 528 is configured to analyze training X-ray images 529 and determine features including a center position of the training X-ray image 529 a rotation of the oxygen sensor 101 and a fan-beam distortion. After determining these features in the training X-ray images 529, the machine learning algorithm 528 accounts for the determined features and uses pattern matching to identify pseudo X-ray images 530 that are similar to the training X-ray images 529. Mistakes made by the machine learning algorithm 528 in correlating (e.g., comparing) the pseudo X-ray images 530 representing properly and improperly assembled oxygen sensors 101 to training X-ray images 529 of properly and improperly assembled oxygen sensors 101 can be corrected by input from the user device 532. The machine learning algorithm 528 is configured to modify its own code based on the input from the user device 532.

The model building block 524 produces trained oxygen sensor defect detection models 522. The model building block 524 does this by learning sets of comprehensive classification rules produced by the machine learning algorithm 528 and building those rules into models configured to be used by the model execution algorithm 508. The trained oxygen sensor defect detection models 522 are used in determining that a production X-ray image 200 (e.g an X-ray image 200 of an oxygen sensor 101 from a production line) depicts either a properly assembled oxygen sensor 101, or an improperly assembled oxygen sensor 101. For example, the model building block 524 may determine, based on feedback in the form of input from the user device 532, rules useful for identifying a particular defect in a production X-ray image 200 by comparison to a pseudo X-ray image 530. In one embodiment, a trained oxygen sensor defect detection model 522 starts as an untrained model (not shown) in local storage 510 and is iteratively updated locally via corrective feedback 531 from the user device 532. In another embodiment, a trained oxygen sensor defect detection model 522 is produced by reproducing all or part of a pre-existing trained oxygen sensor defect detection model 522.

The model execution algorithm 508 analyzes the pixels of the production X-ray image 200 for evidence of manufacturing defects using a trained oxygen sensor defect detection model 522. For example, one type of assembly defect includes data contacts 118 or power contacts 120 being twisted, bent, out of alignment or failing to make contact with the sensor element 102. Another type of assembly defect includes a retaining component like the retaining bushing 106, the securing bushing 121, or the isolation bushing 126 being tilted, cracked, or broken. Yet another type of assembly issue includes the spring clip 122 being bent or broken. The trained oxygen sensor defect detection model 522 acts as a set of rules to follow when analyzing the X-ray image. Using the trained oxygen sensor defect detection model 522, the model execution algorithm 508 determines a misalignment, rotation, and fan-beam distortion of the production X-ray image 200. The model execution algorithm 508 correlates the production X-ray image 200 to pseudo X-ray images 530 using pixel pattern matching according to one of the trained oxygen sensor defect detection models 522. If the model execution algorithm 508 determines that the pseudo X-ray image 530 and the production X-ray image 200 are a sufficient match (e.g., the model execution algorithm 508 calculates a sufficient probability that both images depict an oxygen sensor 101 having a particular defect), the model execution algorithm 508 produces, via the electronic processor 504, an output signal indicating the determination. In one embodiment, the model execution algorithm 508 determines that an oxygen sensor 101 is improperly assembled when an analysis of the production X-ray image 200 using a trained model returns a 75-100% probability that the production X-ray image 200 depicts a unique feature (e.g., particular defect) also found in a pseudo X-ray image 530 identified (e.g., labeled by a user device 532) as a representation of an improperly assembled oxygen sensor 101.

Figure 6:
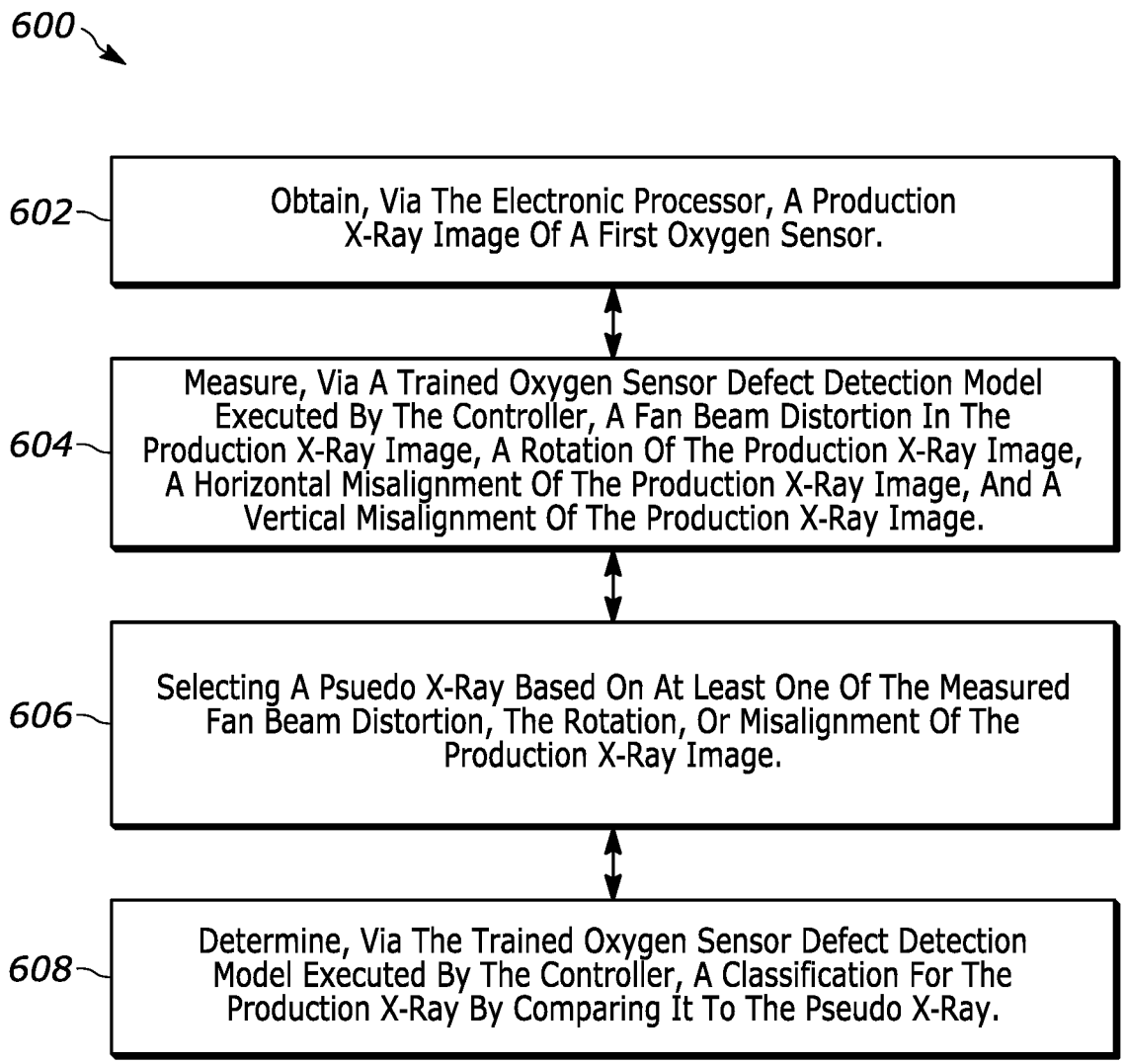
FIG. 6 is a flowchart for a method for visual inspection of oxygen sensors according to some embodiments.

FIG. 6 illustrates a flowchart 600 for a method of the enhanced visual inspection of oxygen sensors 101. In the example shown, the X-ray imaging device 226 produces a production X-ray image 200 of an oxygen sensor 101 and the electronic processor 504 obtains the production X-ray image 200 from the X-ray imaging device 226 (block 602). In one example, the X-ray imaging device 226 communicates the production X-ray image 200 to the controller 502 wirelessly.

At block 604, the electronic processor 504 executes the model execution algorithm 508 and determines a fan-beam distortion, a rotation, a horizontal misalignment, and a vertical misalignment of the production X-ray image 200. Fan-beam distortion can be determined by identifying one or more surfaces within the production X-ray image 200 that appear to be tilted when they should not appear titled. A rotation of the production X-ray image 200 can be determined by measuring the width of an aperture 228 of the oxygen sensor 101 and trigonometrically correlating (e.g., comparing) the measured width to a measured width of the sensor element 102 to determine a rotational misalignment of the sensor with respect to the X-ray imaging device 226. Misalignment of the production X-ray image 200 can be determined by identifying a portion of the production X-ray image 200 that should be centered and determining that portion's positional offset from the center of the production X-ray image 200.

At block 606, the electronic processor 504, executing the model execution algorithm 508, selects a pseudo X-ray image 530 for correlation to the production X-ray image 300 based on at least one of the measured fan-beam distortion, rotation, or misalignment of the production X-ray image. In one embodiment, the electronic processor 504 queries the central computing system 520 for a plurality of pseudo X-ray images 530 of properly and improperly assembled oxygen sensors 101. In another embodiment, the electronic processor 504 queries the central computing system 520 for a particular pseudo X-ray image 530 (e.g. a pseudo X-ray image 530 representing an improperly assembled oxygen sensor 101 having a particular defect).

At block 608, the model execution algorithm 508 performs a pattern matching comparison of the production X-ray image 200 and the pseudo X-ray image 530, to determine a matching confidence value as a result of this comparison. If the model execution algorithm 508 determines with sufficient confidence (e.g., 60%-100% confidence) that a portion of the production X-ray image 200 matches the pseudo X-ray image 530, the electronic processor 504 outputs a signal indicating a determined classification for the production X-ray image 200 matching the classification of the matching pseudo X-ray image 530 (e.g., representing/depicting a properly assembled or improperly assembled oxygen sensor 101). If the model execution algorithm 508 determines an insufficient confidence of a match between the production X-ray image 200 and the pseudo X-ray image 530, the electronic processor 504 outputs a signal indicating that the pseudo X-ray image is not a match, the method returns to block 606, and the electronic processor 504 obtains a pseudo X-ray image 530 from central computing system 520 for comparison to the production X-ray image 200. If no other pseudo X-ray images 530 are available for comparison, the electronic processor 504 outputs a signal indicating that the oxygen sensor 101 could not be classified.

One of ordinary skill in the art will recognize that the classifications of the X-ray image 200 can be correlated to the assembly process for assembling an oxygen sensor 101. The classifications can therefore be used to automatically adjust the processes or components (e.g. robotic arms, actuators, conveyors) used in assembling the oxygen sensors 101. In some embodiments, the electronic processor 504 communicates the signal indicating a determined classification of the production X-ray image 200 to at least one component of an assembly plant line (not shown) that assembles oxygen sensors 101. In response to receiving a signal indicating that the X-ray image 200 is classified as depicting an improperly assembled oxygen sensor 101, the component of the assembly plant line may automatically adjust its speed, timing, movements, or tolerances for assembling the oxygen sensors 101. In some embodiments, the electronic processor 504 communicates the determined classification of the production X-ray image 200 to a human operator (not shown) associated with the assembly of the oxygen sensor 101. In such a case, oxygen sensor imaging and inspection system 500 may communicate the determined classification of the production X-ray image 200 and other pertinent data about the associated oxygen sensor 101 (e.g. oxygen sensor 101 serial number, production time, etc.) to the human operator via a wireless communication protocol as a text message. The oxygen sensor imaging and inspection system 500 may also communicate the signal indicating the determined classification of the production X-ray image 200 and other pertinent data about the associated oxygen sensor 101 to a display screen monitored by the human operator. The display screen may display an alert in response to receiving a signal indicating that an oxygen sensor 101 is improperly assembled. The human operator may then adjust the processes or components used in assembling the oxygen sensors 101 in response to seeing the alert. For example, the human operator may slow a conveyor or stop the assembly process in response to seeing the alert.

Various features, advantages, and embodiments are set forth in the following claims.

What is claimed is:

1. A system configured to detect defects in a first oxygen sensor, the system comprising:
   an X-ray imaging device configured to capture a production X-ray image of the first oxygen sensor;
   an electronic processor configured to use a trained oxygen sensor defect detection model to identify a defect of the first oxygen sensor by
      producing a pseudo X-ray image by simulating a projection of a fan beam through computed tomography (CT) data of a second oxygen sensor;
      measuring, via the trained oxygen sensor defect detection model, a fan-beam distortion in the production X-ray image;
      selecting, via the trained oxygen sensor defect detection model, the pseudo X-ray image based on the fan-beam distortion;
      performing a comparison, via the trained oxygen sensor defect detection model, of the production X-ray image to the pseudo X-ray image; and,
      classifying, based on the comparison, the production X-ray image as representing an improperly assembled oxygen sensor.

2. The system of claim 1 wherein using the trained oxygen sensor defect detection model to identify the defect further includes
measuring, via the trained oxygen sensor defect detection model, a rotation of the production X-ray image; and,
selecting, via the trained oxygen sensor defect detection model, the pseudo X-ray image based on the rotation.

3. The system of claim 2 wherein using the trained oxygen sensor defect detection model to identify the defect further includes
measuring, via the trained oxygen sensor defect detection model, a horizontal misalignment of the production X-ray image and a vertical misalignment of the production X-ray image; and,
selecting, via the trained oxygen sensor defect detection model, the pseudo X-ray image based on the vertical and horizontal misalignment.

4. The system of claim 1, wherein using the trained oxygen sensor defect detection model to identify the defect further comprises obtaining the pseudo X-ray image from a central computing system.

5. The system of claim 1, wherein performing the comparison comprises performing a pixel pattern matching comparison.

6. The system of claim 1, wherein producing the pseudo X-ray image further comprises producing a plurality of pseudo X-ray images by simulating a projection of a fan beam through CT data of the second oxygen sensor and CT data of a third oxygen sensor,
wherein the second oxygen sensor is an improperly assembled oxygen sensor,
wherein the third oxygen sensor is a properly assembled oxygen sensor, and
wherein selecting, via the trained oxygen sensor defect detection model, the pseudo X-ray image based on the fan-beam distortion comprises selecting one of the plurality of pseudo X-ray images.

7. The system of claim 1, wherein using the trained oxygen sensor defect detection model to identify a defect of the first oxygen sensor further comprises outputting a signal indicative of a classification of the production X-ray image.

8. A non-transitory, computer-readable medium containing instructions that, when executed by an electronic processor, cause the electronic processor to:
obtain a production X-ray image of a first oxygen sensor;
produce a pseudo X-ray image by simulating a projection of a fan beam through computed tomography (CT) data of a second oxygen sensor;
measure, via a trained oxygen sensor defect detection model, a fan-beam distortion in the production X-ray image;
select, via the trained oxygen sensor defect detection model, the pseudo X-ray image based on the fan-beam distortion;
perform a comparison, via the trained oxygen sensor defect detection model, of the production X-ray image to the pseudo X-ray image; and,
classify based on the comparison, the production X-ray image as representing an improperly assembled oxygen sensor.

9. The non-transitory, computer-readable medium of claim 8, wherein the instructions further cause the electronic processor to
measure, via the trained oxygen sensor defect detection model, a rotation of the production X-ray image; and,
select, via the trained oxygen sensor defect detection model, the pseudo X-ray image based on the rotation.

10. The non-transitory, computer-readable medium of claim 9, wherein the instructions further cause the electronic processor to
measure, via the trained oxygen sensor defect detection model, a horizontal misalignment of the production X-ray image and a vertical misalignment of the production X-ray image; and,
select, via the trained oxygen sensor defect detection model, the pseudo X-ray image based on the vertical and horizontal misalignment.

11. The non-transitory, computer-readable medium of claim 8, wherein the instructions further cause the electronic processor to obtain the pseudo X-ray image from a central computing system.

12. The non-transitory, computer-readable medium of claim 8, wherein the instructions causing the electronic processor to perform the comparison of the production X-ray image to the pseudo X-ray image cause the electronic processor to perform a pixel pattern matching comparison.

13. The non-transitory, computer-readable medium of claim 12, wherein the instructions causing the electronic processor to produce the pseudo X-ray image cause the electronic processor to produce a plurality of pseudo X-ray images by simulating a projection of a fan beam through CT data of the second oxygen sensor and CT data of a third oxygen sensor,
wherein the second oxygen sensor is an improperly assembled oxygen sensor,
wherein the third oxygen sensor is a properly assembled oxygen sensor, and
wherein the instructions causing the electronic processor to select, via the trained oxygen sensor defect detection model, the pseudo X-ray image based on the fan-beam distortion cause the electronic processor to select one of the plurality of pseudo X-ray images.

14. The non-transitory, computer-readable medium of claim 13, wherein the instructions further cause the electronic processor to output a signal indicative of a classification of the production X-ray image.

15. A method of using a machine learning algorithm to produce a trained oxygen sensor defect detection model, the method comprising:
providing, to a machine learning algorithm, computed tomography (CT) data collected by scanning a plurality of oxygen sensors;
producing a plurality of pseudo X-ray images by simulating a projection of a fan beam through CT data;
identifying, for the machine learning algorithm, a grouping of pseudo X-ray images representing properly manufactured oxygen sensors and a grouping of pseudo X-ray images representing improperly manufactured oxygen sensors;
providing, to the machine learning algorithm, a plurality of X-ray images of oxygen sensors;
identifying, for the machine learning algorithm, a grouping of X-ray images of properly manufactured oxygen sensors and a grouping of X-ray images of improperly manufactured oxygen sensors within the plurality of X-ray images;
training, via machine learning algorithm, the oxygen sensor defect detection model by
causing the machine learning algorithm to perform a first correlation of the X-ray images of improperly manufactured oxygen sensors to the pseudo X-ray images representing improperly manufactured oxygen sensors, causing the machine learning algorithm to perform a second correlation of the X-ray images of properly manufactured oxygen sensors to the pseudo X-ray images representing properly manufactured oxygen sensors, providing, to the machine learning algorithm, corrections to mistakes made by the machine learning algorithm in performing the first correlation, providing, to the machine learning algorithm, corrections to mistakes made by the machine learning algorithm in performing the second correlation, and updating the oxygen sensor defect detection model based on the first and second correlation, and the corrections.

16. The method of claim 15, wherein performing the first correlation includes accounting for a fan-beam distortion of the plurality of X-ray images.

17. The method of claim 15, wherein performing the first correlation includes accounting for a rotation of the plurality of X-ray images.

18. The method of claim 15, wherein performing the first correlation includes accounting for a horizontal misalignment of the plurality of X-ray images and a vertical misalignment of the plurality of X-ray images.

* * * * *